M. McDONALD.
Fishway.
No. 218,299.  Patented Aug. 5, 1879.
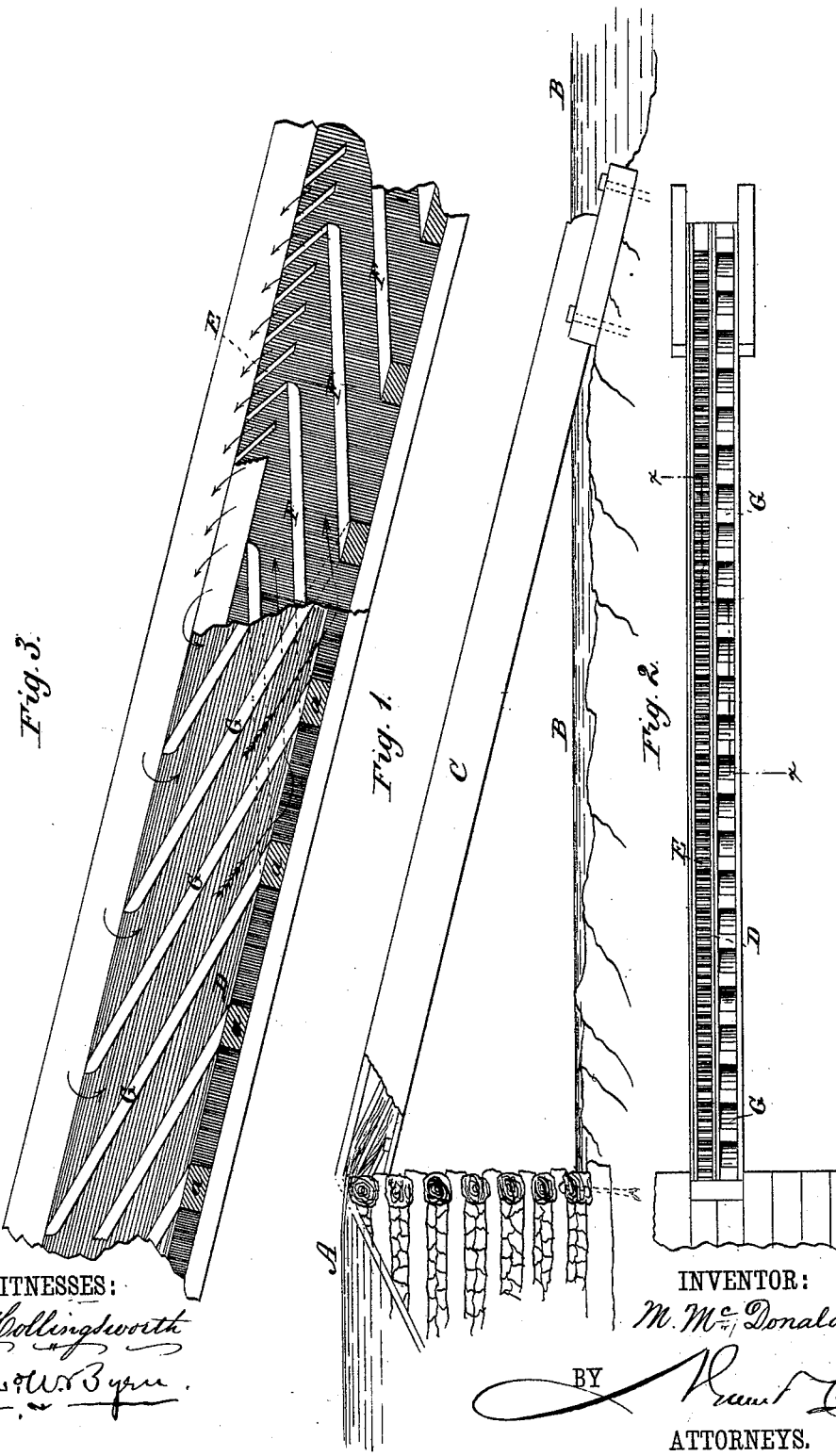
WITNESSES:
W. W. Hollingsworth
Edw. W. Byrn
INVENTOR:
M. McDonald
BY 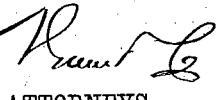
ATTORNEYS.

UNITED STATES PATENT OFFICE

MARSHALL McDONALD, OF LEXINGTON, VIRGINIA.

IMPROVEMENT IN FISHWAYS.

Specification forming part of Letters Patent No. 218,299, dated August 5, 1879; application filed May 27, 1879.

*To all whom it may concern:*

Be it known that I, MARSHALL McDONALD, of Lexington, in the county of Rockbridge and State of Virginia, have invented a new and Improved Fishway; and I do hereby declare that the following is a full, clear, and exact description of the same, reference being had to the accompanying drawings, forming part of this specification, in which—

Figure 1 is a side elevation. Fig. 2 is a plan view. Fig. 3 is an enlarged longitudinal section taken through the line $x$ $x$ of Fig. 2.

My invention relates to a device for enabling fish to ascend rivers obstructed by dams, so as to facilitate the propagation of the same.

The invention is constructed upon the same general principle as the fishway for which Letters Patent were granted me September 24, 1878. In such fishway I utilized the velocity or pressure of the head of water at the dam by directing said head of water through a series of openings on an incline, which openings were arranged to discharge upwardly, so that an initial upward current on the incline was produced, which enabled the fish to ascend the incline with the same.

My present invention is designed more particularly for small streams or conditions under which a limited amount of water only is available; and to this end it consists in combining a series of partitioned chambers located beneath the upwardly-discharging openings and a series of buckets or traps located on the side of the upwardly-discharging openings, which buckets or traps communicate at the bottom with the chambers of the upwardly-discharging openings lying lower on the incline, so that the overflow from a given section of upwardly-discharging openings passes down into the adjacent laterally-arranged buckets, and passing thence to one of the lower chambers below the inclined openings rises through a section of the latter which lie lower down the incline, by which arrangement it will be seen that a given body of water in its descent is used over and over again, which adapts the fishway to small streams or a limited supply of water.

In the drawings, A represents the breast of the dam; B B, the lower level of the stream, and C the fishway, fixed at its upper end to the breast of the dam, and supported at its lower end upon the bed of the stream below, so as to occupy an inclined position.

The fishway is constructed of any suitable material, in the form of a sluiceway, with a bottom and two sides, and has throughout its length a central longitudinal partition, D, which rests upon cross-bars or cleats $a$, placed an equal distance apart upon the bottom of the way. Upon one side of this partition are arranged the upwardly-inclined plates E, which form openings that discharge the water upwardly, to assist the fish in their ascent; and just beneath these plates E are arranged reversely-inclined partitions F, forming subjacent chambers, each of which communicates with several of the upwardly-discharging openings. Upon the opposite side of the longitudinal partition D are arranged a series of partitions, G, having the same general inclination as the way, and a reversed inclination to the partitions F. These partitions G form buckets or traps, which open at the top into the space between the walls of the fishway, and at the bottom communicate with the chambers between the partitions F, through the space left between the cross-bars or cleats $a$ beneath the longitudinal partition D.

Now, in the operation of the fishway, it will be seen that the water from the breast of the dam passes first into one of the subjacent chambers, and rises through the upwardly-discharging openings. It then flows to one side and enters the buckets or traps, and, passing down the latter, enters the subjacent chamber of the next lower section of upwardly-discharging openings, and is thus used over and over again until it reaches the lower level of the stream. To give a proper head to the water thus circulating, the incline of the buckets and the reversed incline of the subjacent chambers give a sufficient descent to the water to permit it to issue each time at the upwardly-discharging openings with the required velocity, the overflow into any one bucket appearing in alternate sections of the upwardly-discharging openings below.

As shown in the drawings, the apparatus is represented in its simplest form—*i. e.*, with one series of buckets or traps and one series of upwardly-discharging openings. I may, however, multiply this arrangement to any desired extent—i. e., I may make it in three parallel sections, one central row of upwardly-discharging openings, with a series of buckets on each side; or I may arrange the discharging-openings and receiving-buckets in alternate recurrence to any desired width of way.

In making use of this general principle, I may make the way wide enough to form a channel for the passage of boats, and utilize this upward current to carry boats from the lower to the upper level of the stream.

Having thus described my invention, what I claim as new is—

1. A way for the ascent of fish, consisting of a series of upwardly-inclined plates, forming discharging-openings, a set of subjacent chambers communicating therewith, and a parallel series of buckets opening into the general level of the way at the top and into the subjacent chambers of the discharge-openings at the bottom, all combined substantially as and for the purpose described.

2. The combination, with the walls and bottom of the way, of the cross-bars or cleats $a$, the longitudinal partition D, resting thereupon, the reversely-inclined partitions G and F, forming buckets and chambers, communicating with each other beneath the partition D, and the inclined plates E, substantially as and for the purpose described.

The above specification of my invention signed by me this 22d day of May, 1879.

MARSHALL McDONALD.

Witnesses:
EDW. W. BYRN,
SOLON C. KEMON.